Oct. 7, 1941.   J. F. WINDSOR ET AL   2,257,875
ELECTRIC WELDING MACHINE
Original Filed June 26, 1936   2 Sheets-Sheet 1

INVENTOR
JOHN F. WINDSOR
CLAYTON MARK, JR.
BY Clarence Kerr
ATTORNEY

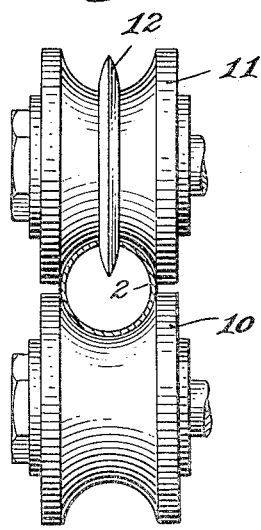
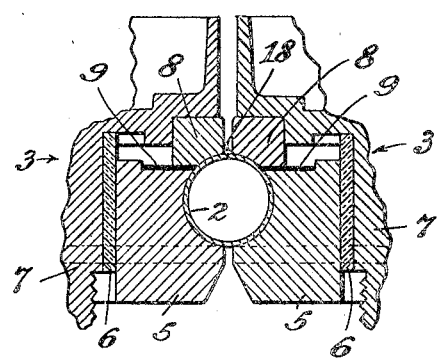
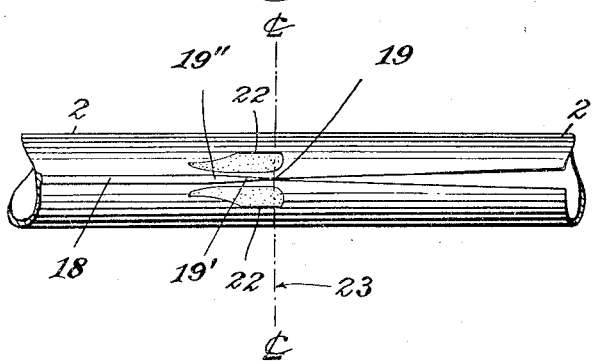

Patented Oct. 7, 1941

2,257,875

UNITED STATES PATENT OFFICE 2,257,875

ELECTRIC WELDING MACHINE

John F. Windsor, Chicago, and Clayton Mark, Jr., Evanston, Ill., assignors, by mesne assignments, to The Youngstown Sheet and Tube Company, Youngstown, Ohio, a corporation of Ohio Original application June 26, 1936, Serial No. 87,532, now Patent No. 2,188,326, dated January 30, 1940. Divided and this application November 17, 1939, Serial No. 304,904

7 Claims. (Cl. 219—6)

This invention relates to the electric welding of tubing. It is concerned particularly with that type of welding wherein flat stock or skelp formed into tubular shape with its edges adjacent each other is caused to travel through an electrode throat wherein the edges are pressed together and an electric current is passed across the seam formed by the abutting edges to thereby weld the stock into a tube. The welding heat is produced by the passage of the current against the resistance of the seam. Such welding has for many years been carried out by alternating current, as exemplified by the Parpart patent, No. 658,741, and the Johnson patent, No. 1,388,434. More recently, as disclosed in the Sykes Patent No. 1,920,900, it has been discovered how the requisite low-voltage high-amperage direct current could be produced for effecting this type of welding, with consequent avoidance of the undesirable stitch effect inherent in operation at substantial speeds when alternating current is employed. The present invention is particularly concerned with improvements especially advantageous in the welding of tubing by direct current, though it may also be employed to advantage in tube welding by alternating current.

The requirement in tube welding is to furnish to each increment of length of the tube a definite quantity of heat energy sufficient to bring the metal adjacent the seam to a welding temperature in the time which it occupies in passing through the heating zone. This means that the product $I^2R$, (i. e., the square of the current flowing across the length of seam being heated multiplied by the resistance of the path across the seam) must be kept constant so long as the seam moves at a constant speed.

With alternating current welding heads it is customary to supply the welding current from a transformer mounted directly on the head and having its primary supplied by constant potential from a suitable source. The secondary voltage is therefore nearly constant and is applied directly to the welding electrodes. The current which flows is therefore quite completely controlled by the resistance of the seam and varies when the resistance varies. Furthermore with alternating current, the current is a sine wave whose maximum is 1.41% of the square root of the mean square, or effective value, and the heating and welding occur in a series of more or less overlapping spots so that the result is a series of overlapping spot welds which leave their imprint on the tube in the form of a so-called "stitch." If the current drops, say 10%, the peaks are still well over that necessary for welding and the result is a series of spots a little less overlapped. Or if the current increases there is less danger of burning because of the cooler adjacent metal on each side which within limits can absorb the excess heat.

With direct current welding, we have found that the maintenance of a constant value of R, that is of seam resistance, is especially important for the attainment of continuous welds of maximum uniformity. This is for the reason that the generating machine is situated at a distance from the welding machine and the current is supplied by long leads which necessarily absorb a large and variable proportion of the voltage of the generator so that the voltage at the electrodes will vary inversely with the current for gradual changes. We find that these long leads, carrying many thousands of amperes, also exhibit a high reactance to sudden current changes, so that sudden changes of current do not as readily occur as with alternating current. Both of these effects are highly advantageous in themselves but they result in the necessity of maintaining a very constant seam resistance in order that a constant rate of seam heating may be realized, and continuous perfect welding result.

The resistance in the welding head has two principle components, namely, the useful resistance between the meeting edges of the skelp to be welded and the objectionable resistance between the welding rolls and the tubular surface. Both depend on the constancy of form of the metal near the edges which are to meet and to be welded as they pass through the machine.

One difficulty in using former welding heads with direct current was, we believe, due to a variable seam resistance resulting from the fact that the starting point or seam cleft vertex was neither controllably nor definitely located so that the inevitable slight wave in the seam edges, common to all cold formed tubing, varied its location and correspondingly varied the length and resistance of the closed but unwelded portion of the seam being heated. The same cause also resulted in varying contact resistance between the welding rolls and the blank coming in to be welded.

By our invention we are able to definitely and controllably locate the seam cleft vertex and to position it most advantageously to secure practically constant welding resistance even at very high speeds. We are able at the same time to more definitely control the contour of the surfaces meeting the welding rolls and attain thereby greater constancy of contact resistance. Due to the special advantages of direct current when so used, we obtain continuous perfect welds without stitches or variable metal texture along the seam.

Other objects and advantages of the invention will be hereinafter described and claimed.

In the accompanying drawings:

Fig. 3 is a detail view in front elevation showing the spreader and cooperating lower roll, the tube being shown in cross section.

Fig. 4 is a vertical sectional view through portions of the welding rolls, on line 4—4 of Fig. 2.

Fig. 5 is a fragmentary view showing a portion of a tube and indicating diagrammatically the areas of contact of the electrode portions of the welding rolls with the tube.

Figure 1:
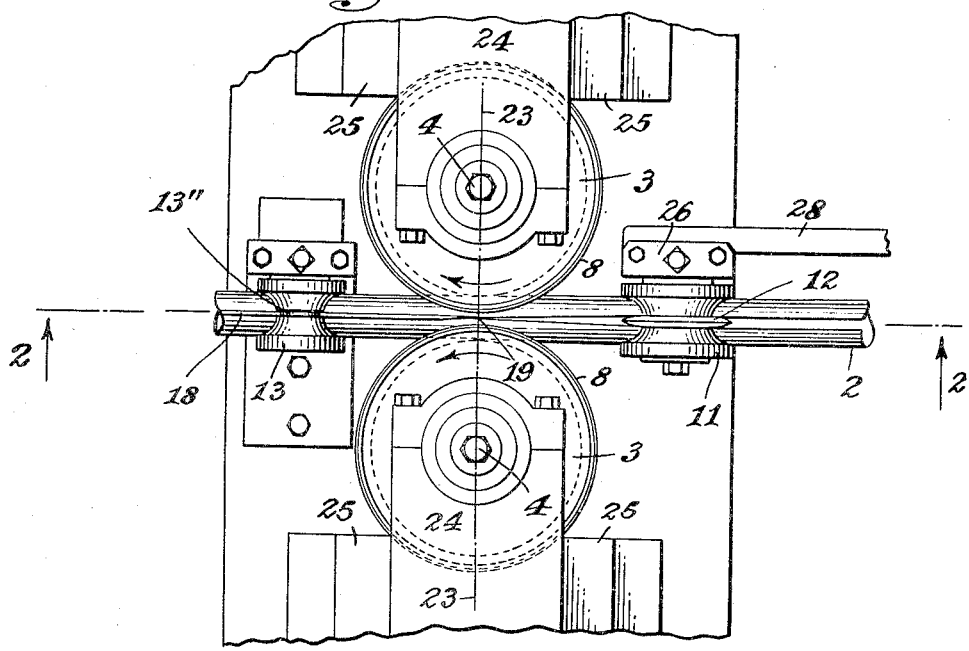
Fig. 1 is a plan view illustrating an embodiment of our invention.

Referring to the drawings, there is shown at 2 a portion of a tubular sheet of metal which may be shaped from a flat strip into tubular form with its edges adjacent each other by passage through a series of forming rollers (not shown) in the customary manner well known in the art. A pair of horizontal welding rolls 3, 3 engage opposite sides of the tube for supporting the latter, and, in conjunction with other elements as hereinafter described, for pressing the edges thereof into firm engagement with each other and passing an electric current thereacross. These rolls 3, which are mounted for rotation about vertical axes 4, 4, may be of any of a variety of forms. As specifically illustrated in Fig. 4, each roll 3 may, for example, comprise a tube-supporting portion 5, separated by insulation 6 from electrode portion 7, which has securely fitted thereto a ring 8 of copper or other suitable electric conducting material for engaging the tube stock adjacent the seam. Insulation 9 is also interposed between the conducting ring 8 and the tube-supporting section 5. The section 5 and ring 8 are of course suitably grooved to conform with the curvature of the tube.

Interposed between the welding or electrode rolls 3, 3 and the forming rolls is a pair of rolls 10, 11, the latter of which is provided with a circumferential fin 12 which extends downwardly into the seam cleft and guides the latter into proper alignment with the rolls 3, 3. The fin 12 is also of sufficient width to spread the seam edges laterally.

On the delivery, or downstream, side of the welding rolls 3, 3 the tube passes between a pair of guiding rolls 13, 13' thence over roll 14 and thence through a series of finishing rolls, one pair of which is indicated at 15, 16. A shaving or cutting element 17 is shown positioned above the roll 14 for removing the exterior burr 18 which is produced as an incident to the welding operation. Roll 13 may be grooved, as shown at 13'', to permit passage of the burr 18 therethrough. The cutting element 17 also serves to bring the tube into true cylindrical form.

In carrying out our invention we so co-ordinate the rolls 3, 3 and the seam spreader 12 as to definitely and controllably locate the seam cleft vertex 19 and to position the latter to secure practically uniform welding resistance. In this connection the roll 11 carrying the spreader fin 12 is positioned sufficiently close to the rolls 3, 3 that the lever action of said fin against the seam cleft edges, with the rolls 3, 3, as a fulcrum, contributes effectively to the definite locating of the vertex 19 and the maintenance of a constant firm pressure between the meeting edges.

Figure 2:
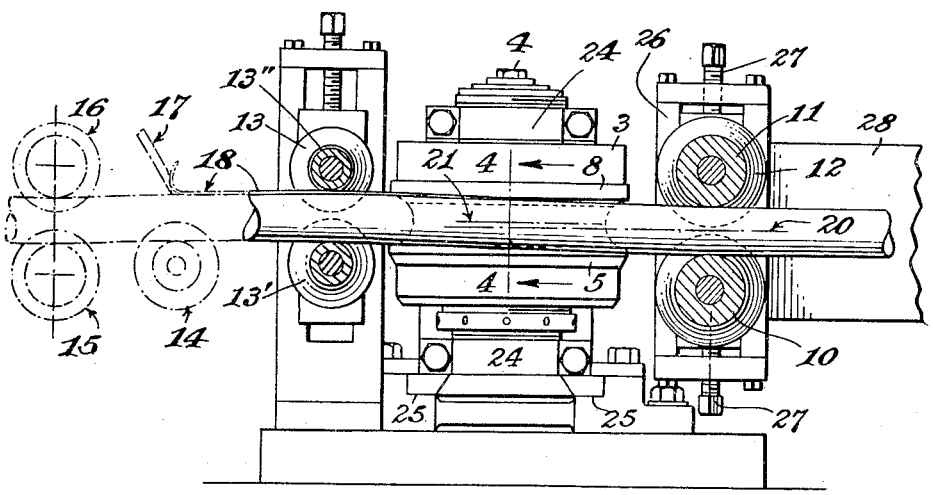
Fig. 2 is a view partly in side elevation and partly in section on line 2—2 of Fig. 1.

In all cold forming machines where a strip of steel is formed into a tube by passing through a series of roller passes, the seam edges are stretched more than the balance of the blank, which gives rise to slight waves in the seam edges and consequent weaving of the blank while passing through the welding rolls. This difficulty we overcome by raising the welding rolls 3, 3 slightly with respect to the center line 20 of the forming, spreader and finishing rolls. In Figure 2 the longitudinal center line of the rolls 3, 3 is shown at 21. The forming and spreader rolls 10, 11 constitute guiding elements which hold the adjacent portion of the tube blank in a position in which its center line 20 lies to one side of the longitudinal center line 21 of the electrode rolls 3. This feature causes the tube to be slightly bent as it enters the welding rolls, i. e., on the upstream side of the rolls, thereby stretching the seam edges which are on the outside of the bend, and thereby eliminating the waves, so that the edges will register accurately when brought together at the cleft vertex. This produces convexity of the blank from the feed-in rolls 10, 11 up to or beyond the welding throat. Also, an open seam tube that is bent will not twist, whereas a straight one will. The raised electrodes therefore greatly help to steady the tube and keep the seam centered between the electrodes. Another advantage of the raised electrodes is that they prevent the blank from coming into contact with the electrodes substantially ahead of the cleft vertex and increase the contact on the delivery side adjacent the zone of heating and welding. We have found in practice that raising the rolls 3, 3, to bring their longitudinal center line 21 from $\frac{1}{32}''$ to $\frac{1}{8}''$ above center line 20 (the amount of elevation depending on the size and gauge of the tubing being welded) is effective to achieve the foregoing results. In lieu of raising the rolls 3, 3, the same effect may of course be attained by lowering the spreader 12 with respect to said rolls.

When a pair of electrode rolls surround a tube and squeeze it between them they do not simply form a line contact, but on the contrary they engage the tube over an extended area. This is true of electrodes generally, however positioned, and it essentially affects the current distribution across the seam. With electrodes in a vertical plane turning about axes in alinement an essentially pure rolling motion of the electrodes along the seam edges occurs and the area of contact adjacent the seam is narrow but with horizontal rolls turning about parallel vertical axes an essentially wiping contact occurs near the seam edges, the contact area is large and the disposition of this contact area longitudinally of the seam and with respect to the line connecting the axes of the rolls is affected in an important manner both by the elevation of the rolls and the thickness and positioning of the spreader. In Figure 5 there are illustrated at 22, 22, areas of contact between the rolls 3, 3, and the tubing, when the rolls are elevated slightly as above described, and the spreader 12 is located quite close to the rolls and proportioned to force open the seam a substantial amount. Due to the elevation of said rolls, the major portion of their contact area is, as shown, located to the rear (or on the delivery side) of their transverse center line 23, or, in other words, the contact area forward of said center line is substantially eliminated due to the holding down action of the spreader at a lower level.

In all former welding heads, so far as we are aware, the finish of the welding operation has been on the transverse center line of the electrode or compression rolls, where the maximum upsetting of the blank occurred. The start of the welding operation was at the cleft vertex, which was in advance of this point. All the effective welding current in any such welding operation, passes between these points and all current crossing the seam after the tube is welded or going around the tube without crossing the seam, is waste current.

One difficulty of using former welding heads with direct current was that the starting point or cleft vertex was not controllably located, nor even definitely located, so that the slight wave in the seam edges, common to all cold formed tubing due to stress, greatly varied its location. When the cleft vertex shifted toward the transverse center line of the electrode or compression rolls, it shortened up the effective welding current path and sent more current across the seam behind the weld. The effective welding current was therefore considerably changed without noticeably affecting the total current used.

Through our invention, the important point, the cleft vertex, is definitely and controllably positioned, at or preferably close to the transverse center line 23 of the electrode rolls 3, 3. The line of maximum compression of the tube blank under the action of the electrode rolls and seam spreader is also thereby controllably located on the delivery side of said center line, and so likewise is the zone of heating and welding. The heating and welding zone extends rearwardly (i. e., toward the delivery side of the apparatus) from the cleft vertex beyond the line of the maximum compression aforesaid. The aforesaid line of maximum compression is rearward of the cleft vertex, and the heating and welding zone extends rearwardly somewhat beyond said line of maximum compression. Thus, in Figure 5, the line of maximum compression may be illustrated as approximately in the region designated 19' and the rear end of the heating and welding zone approximately in the region designated 19'', though it will be appreciated that this is simply illustrative, and that the length of said heating and welding zone, as well as the location of the line of maximum compression, are dependent upon the width and location of the spreader with respect to the electrode rolls. But in welding a wide range of tubes, and with varying speeds, with our apparatus we have observed in each instance a heating and welding zone extending rearwardly from the cleft vertex beyond the aforesaid line of maximum compression, in which heating and welding zone the welding temperature is attained and welding is effected.

In Fig. 5, with the cleft vertex 19 positioned in the center line 23 by the coaction between the rolls 3, 3 and spreader 12, the heating and welding zone extends from said center line rearwardly, or on the delivery side of said center line; and since, by the elevation of said rolls, the irregularities in the seam edges are obviated, a definitely positioned heating and welding zone of definite length is obtained throughout the welding of the tube and a greater uniformity of contact resistance between the tube and rolls secured. In other words, the heating and welding zone remains of practically constant length and resistance throughout the travel of the tube past said electrode rolls.

Through adjustment of the spreader 12 longitudinally with respect to the rolls 3, 3, or adjustment of the latter transversely, to vary the pressure applied to the tube 2, or by both such adjustments, the cleft vertex may be definitely located as desired, and the heating and welding zone correspondingly positioned. We prefer that the cleft vertex be located substantially at the transverse center line of the electrode rolls, or somewhat rearwardly thereof, and that the heating and welding zone be substantially entirely rearward, or on the delivery side of said center line. By raising the welding rolls above the normal line of travel of the tube, as already described, we not only keep the edges in alinement and free from waves, but also determine that the contact area of the rolls shall also be positioned on the delivery side of the center line as shown in Figure 5 so that the resistance across the seam in the welding zone shall be a minimum and the short circuiting effect of the already welded seam a minimum. In addition to the advantages hereinbefore noted with respect to our invention, we find that by locating the heating and welding zone substantially entirely on the delivery side of said electrode center line, the resistance to the passage of the welding current is diminished.

The axes 4, 4 of the electrode rolls 3, 3 are mounted in supports 24, 24 which may be slidably adjusted in suitable guideways 25, 25 to various positions transversely of the tube, to apply any desired pressure to the latter. Said supports 24, 24 may be clamped or bolted, or otherwise locked in adjusted position by any suitable means. Also the rolls 10, 11 are shown mounted in a frame 26 in which they may be adjusted vertically through threaded bolts 27, 27. Similar means may be provided for adjusting the rolls 13, 13' vertically. If desired, the supports 24, 24 for the electrode rolls 3, 3 may similarly be adjusted in their guideways 25, 25 by suitable horizontal threaded bolts engaging the ends of said supports 24, 24. Frame 26 is secured to a bar 28 which may be connected in any suitable way with a support or main frame, as by a slot and bolts (not shown), so as to be adjustable longitudinally of the tube, thereby to bring the spreader 12 to any desired distance from the rolls 3, 3.

It may be observed that through the employment of horizontal electrode rolls in conjunction with the seam positioner 12, the full effect of the spreader is available for positioning the cleft vertex, whereas with electrode rolls of the type shown in the Parpart and Johnston patents above referred to, any attempted spreading of the seam as it approaches the rolls would be distinctly limited and would result in increase in tube contact with the rolls on the entering side. By locating the plane of the electrode rolls at right angles to the plane of the spreader, we avoid interference with the spreading action and enable the latter to be freely attained without substantial contact between the tube and electrodes forwardly of the transverse center line of the latter.

As a result of accurately controlling the position of the cleft vertex, and hence the length of the heating and welding zone, we are able to weld much smaller sizes of tubing than heretofore. In addition, because of the accurate control of resistance which our invention makes possible, we are able, with direct current, to operate at speeds as high as 200 feet per minute, regardless of the size of the tubing, a result which we believe has not even been approached with other machines.

The main difficulty encountered in the welding of high carbon or high tensile steel tubing is due to the tendency of the tube to open while the weld metal is still soft and highly plastic. The higher the tensile strength of the steel, the greater is this spring action tending to pull the weld apart before the metal in the weld has chilled sufficiently to reach a high enough tensile strength to resist such stresses.

Due to the action of our electrode throat and spreader we exert a closing pressure on the seam for a considerable distance beyond the center line of electrodes on the delivery side, which compresses the welded seam for a sufficient period of time to permit the weld metal to reach a condition where it will successfully resist the action of the residual stresses left in the body of the tube from the cold forming operation.

With the use of the electrode throat arrangement described above, we have successfully welded high tensile steel tubing without encountering the difficulties encountered on the conventional type of electrode throat. With this method we have successfully welded steel tubing 1 ⅝" O. D. by 0.125" wall thickness with carbon 0.50 to 0.70%.

The present application is a division of our co-pending application Serial Number 87,532 filed June 26, 1936, now Patent No. 2,188,326, granted January 30, 1940.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In apparatus for electrically welding a tube blank having a longitudinal seam, progressively during travel of the blank, a pair of horizontal electrode rolls, and means for displacing the axis of the tube on the upstream side of said rolls from the longitudinal center line of said rolls, said rolls being adjusted vertically to effect said displacement of the tube axis whereby the area of maximum pressure between the electrode rolls and the seam side of the tube lies principally on the downstream side of said rolls.

2. In apparatus for electrically welding a tube blank having a longitudinal seam, progressively during travel of the blank, a pair of horizontal electrode rolls, and means for displacing the axis of the tube on the upstream side of said rolls from the longitudinal center line of said rolls, said rolls being adjusted vertically to effect said displacement of the tube axis whereby the area of maximum pressure between the electrode rolls and the seam side of the tube lies principally on the downstream side of said rolls, said means for displacing the tube axis comprising means for spreading said longitudinal seam.

3. In apparatus for electrically welding a tube blank progressively during travel of the latter, a pair of electrode rolls for engaging said blank on opposite sides of the seam and passing a current thereacross, and means adjacent said rolls and extending into the seam cleft for spreading the seam edges outwardly, said rolls being positioned in a plane at right angles to that of said spreading means, and said spreading means comprising a guiding element arranged to hold the adjacent portion of the tube blank in a position in which the center line of the tube blank lies to one side of the longitudinal center line of the electrode rolls and to one side of that plane which contains said longtiudinal center line and which is normal to the axes of said electrode rolls.

4. In apparatus for electrically welding a tube blank during travel of the latter, a pair of electrode rolls for engaging said blank on opposite sides of the seam and passing a current thereacross, and means adjacent said rolls on the upstream side thereof and extending into the seam cleft for spreading the seam edges outwardly, said spreading means comprising rolls arranged to form a guiding roll pass, the center line of said guiding roll pass being displaced to one side of the longitudinal center line of the electrode rolls in a direction substantially parallel to the axes of rotation of said electrode rolls.

5. In apparatus for electrically welding a tube blank during travel of the latter, a pair of electrode rolls for engaging said blank on opposite sides of the seam and passing a current thereacross, a spreader element having a flange extending into the seam cleft vertex on the upstream side of said rolls for positively spacing the seam edges, said spreader element being arranged to hold the adjacent portion of the tube blank in a position in which the center line of the tube blank lies to that side of the longitudinal center line of the electrode rolls which is farthest removed from the seam edges.

6. In apparatus for electrically welding a tube blank during travel of the latter, a pair of electrode rolls for engaging said blank on opposite sides of the seam and passing a current thereacross, a spreader roll arranged at the upstream side of the electrode rolls, said spreader roll having a portion arranged to bear against the outside of the seam edges and a peripheral flange arranged to extend into the seam cleft vertex, and said spreader roll being arranged so that the portion thereof which bears against the outside of the seam edges holds the adjacent portion of the tube blank in a position in which the center line of the tube blank lies to one side of the longitudinal center line of the electrode rolls and to one side of that plane which contains said longitudinal center line and which is normal to the axes of said electrode rolls.

7. In apparatus for electrically welding a tube blank progressively during travel of the latter, a pair of electrode rolls arranged in a common plane and adapted to contact opposite sides of the blank at the seam, tube blank engaging means on the upstream side of the electrodes, said tube blank engaging means being arranged in a position to displace the axis of the tube at said engaging means to one side of a continuation of the axis of the tube at the transverse center line of said electrode rolls in a direction substantially parallel to the axes of rotation of said electrode rolls.

JOHN F. WINDSOR.
CLAYTON MARK, Jr.